United States Patent
Matsumoto

[11] 3,781,679
[45] Dec. 25, 1973

[54] LOGARITHMIC RECORDING SYSTEM

[76] Inventor: Takao Matsumoto, 60 Kuritaya, Kanagawa-ku, Yokohama, Japan

[22] Filed: Feb. 5, 1973

[21] Appl. No.: 329,445

[52] U.S. Cl............ 324/115, 324/113, 324/132, 346/32, 346/65
[51] Int. Cl... G01r 13/04, G01r 15/10, G01r 15/08
[58] Field of Search............ 324/115, 99 R, 132, 324/113; 346/46, 32, 65

[56] References Cited
UNITED STATES PATENTS

| | | | |
|---|---|---|---|
| 3,471,782 | 10/1969 | Matsumoto | 324/113 |
| 3,582,959 | 6/1971 | Matsumoto | 324/113 |
| 3,652,934 | 3/1972 | Paljug | 324/132 |

Primary Examiner—Rudolph V. Rolinec
Assistant Examiner—Ernest F. Karlsen
Attorney—Kenneth S. Goldfarb

[57] ABSTRACT

A range switching circuit is comprised of a DC amplifier to which is supplied an electric signal to be recorded, a plurality of resistances corresponding to respective digit places within an entire recording range, and a range switching device for selectively connecting the resistances to a feedback path to the DC amplifier. A logarithmic characteristic generating circuit includes a logarithmic potentiometer to produce an output in accordance with the change in the level of the input signal. The outputs from the range switching circuit and the logarithmic characteristic generating circuit are delivered to a comparison circuit, which then produces an output corresponding to the difference therebetween. A servomotor responsive to the output from the comparison circuit drives the aforesaid range switching device and logarithmic potentiometer. A rotary switch is also driven by the servomotor to actuate a relay circuit for controlling the operation of the range switching device, which operates a writing mechanism to record the electric signal.

3 Claims, 2 Drawing Figures

LOGARITHMIC RECORDING SYSTEM

BACKGROUND OF THE INVENTION

This invention relates to a system for logarithmic recording of DC signals, and in particular to improvements in logarithmic recording systems of the type disclosed in my copending application Ser. No. 703,297, "Wide Range Logarithmic Recording Apparatus," filed Feb. 6, 1968, now issued into U.S. Pat. No. 3,582,959.

Usually, for logarithmic recording of DC signals over a wide range covering several digit places, it has been practised to divide the entire recording range into fractions corresponding to the respective digit places and to make switching operation among these fractional ranges as required by the change in the level of the input signals. The prior art logarithmic recording systems based on this scheme have mostly been such that it has been difficult to ascertain proper correlation among the recorded curves of the respective fractional ranges, and continuous or uninterrupted records have been virtually unobtainable. It has thus been impossible to derive any findings from the resultantly obtained logarithmic curves by direct reading.

SUMMARY OF THE INVENTION

In view of the noted inefficiencies of the prior art it is an object of this invention to provide an improved logarithmic recording system which provides uninterrupted logarithmic records covering any desired range so that useful information is derivable therefrom by direct reading.

Another object of the invention is to provide a logarithmic recording system whereby the switching operation of the fractional ranges can be carried out effeciently to provide accurate and uninterrupted records of a phenomenon varying over a wide range.

A further object of the invention is to provide a logarithmic recording system which is simple and inexpensive in construction, positive in operation, and easy to handle and which can be easily adapted for logarithmic recording of various phenomena encountered in such diversified fields as mechanics, chemistry, medicine, biology, space technology, oceanography, and so forth.

With these objects in view and the other objects hereinafter made apparent, this invention provides a logarithmic recording system in which is provided a range switching circuit comprising a DC amplifier to be supplied with an electric signal to be recorded, a plurality of resistances selectively connectable to a feedback path to the DC amplifier and corresponding to respective digit places within an entire recording range, and a range switching device for selectively connecting the resistances to the feedback path to the DC amplifier. A logarithmic characteristic generating circuit is also provided which includes a logarithmic potentiometer consisting of a wirewound resistor arranged in an annular configuration with a gap therein and a brush capable of 360 degrees rotation in sliding contact with the wirewound resistor to produce an output which varies with the change in the level of the input signal. The outputs from the range switching circuit and the logarithmic characteristic generating circuit are both delivered to a comparison circuit, which then produces an output corresponding to the difference therebetween. In responce to this output from the comparison circuit, a servomotor is rotated to drive the range switching device and the logarithmic potentiometer at predetermined gear ratios, and a rotary switch means is also driven by the servomotor in synchronism with the logarithmic potentiometer to actuate a relay circuit adapted to control the operation of the range switching device. A writing mechanism is driven by this range switching device for logarithmic recording of the input signal on a recording medium such as an appropriately scaled strip of paper.

The features which are believed to be novel and characteristic of this invention are set forth with particularity in the appended claims. The invention itself, however, both as to its organization and mode of operation, together with the further objects and advantages thereof, will be best understood from the following description read in connection with the accompanying drawings which illustrate, purely by way of example, a preferred embodiment of the invention and in which like reference characters designate like elements.

DESCRIPTION OF THE PREFERRED EMBODIMENT

Figure 1:
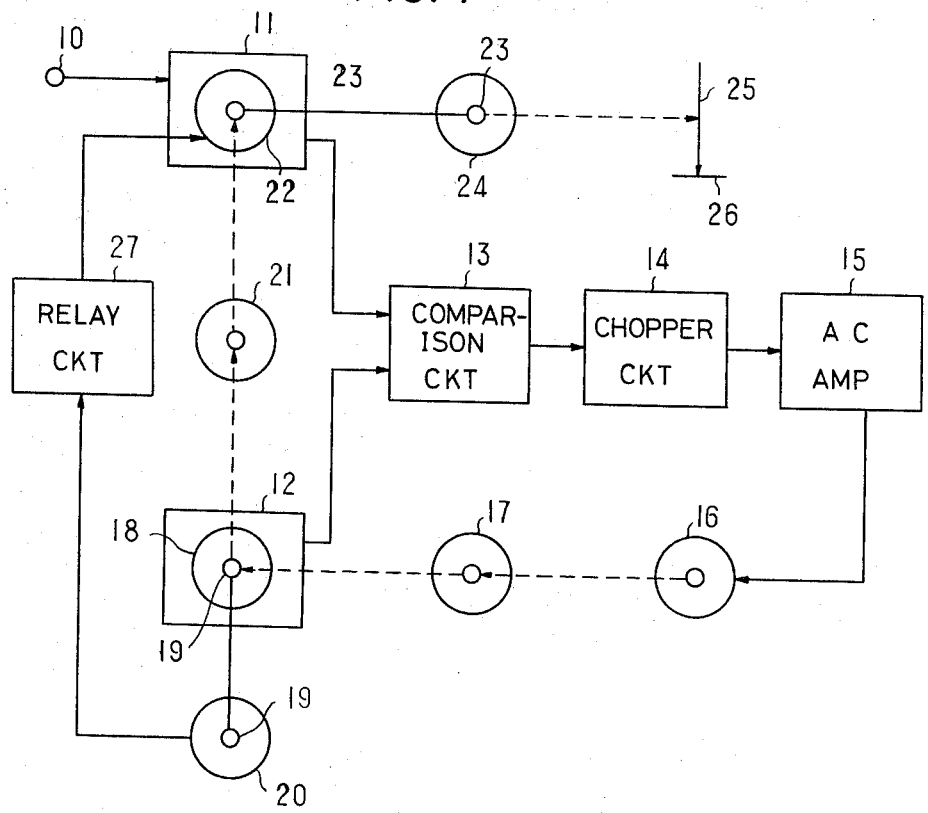
FIG. 1 is a block diagram showing a logarithmic recording system by way of a preferred embodiment of the invention.

The makeup of the logarithmic recording system according to the invention will first be outlined in connection with the preferred embodiment thereof illustrated in FIG. 1. A DC signal to be recorded is supplied through an input 10 to a range switching circuit 11, where the entire recording range of the input signal is divided as required into several constituent fractions by means of a range switching device provided therein. The signal in each of the fractional ranges is amplified by one and the same DC amplifier also provided within this range switching circuit 11, and a DC voltage is delivered therefrom to one of the inputs of a comparison circuit 13.

At a logarithmic characteristic generating circuit 12 there is produced a DC voltage by a logarithmic potentiometer 18 for causing rotation in conformity with the logarithmic characteristic in a drive mechanism hereinafter referred to. This DC voltage is delivered to the other input of the comparison circuit 13. The difference between the outputs from the range switching circuit 11 and from the logarithmic characteristic generating circuit 12 is amplified by the comparison circuit 13, and an output signal for actuating the aforesaid drive mechanism is supplied from the output of the comparison circuit 13 to a chopper circuit 14 where it is converted into the corresponding AC voltage. The output voltage from the chopper circuit 14 is amplified by an AC amplifying circuit 15, and the AC power from this amplifying circuit is supplied to the drive mechanism or a servomotor 16 to rotate the same.

The output shaft of the servomotor 16 is coupled through a speed reduction gear 17 to a shaft 19 for operating both the aforesaid logarithmic potentiometer 18 and a rotary switch 20. The shaft 19 is further coupled to a shaft 23 of the range switching device 22 through another speed reduction gear 21. In this manner the servomotor imparts rotation, at predetermined gear ratios, to the shaft 19 of the logarithmic potentiometer 18 and to the shaft 23 of the range switching device 22. The rotary switch 20 is driven in exact synchronism with the logarithmic potentiometer 18 to control the range switching device 22 for automatic range switching operation via a relay circuit 27.

A pulley 24 is mounted on the shaft 23 of the range switching device 22 for moving in the usual manner a writing implement 25 such as a pen, which pen will then slide over a recording medium 26 such as an appropriately scaled strip of paper to leave records thereon.

Figure 2:
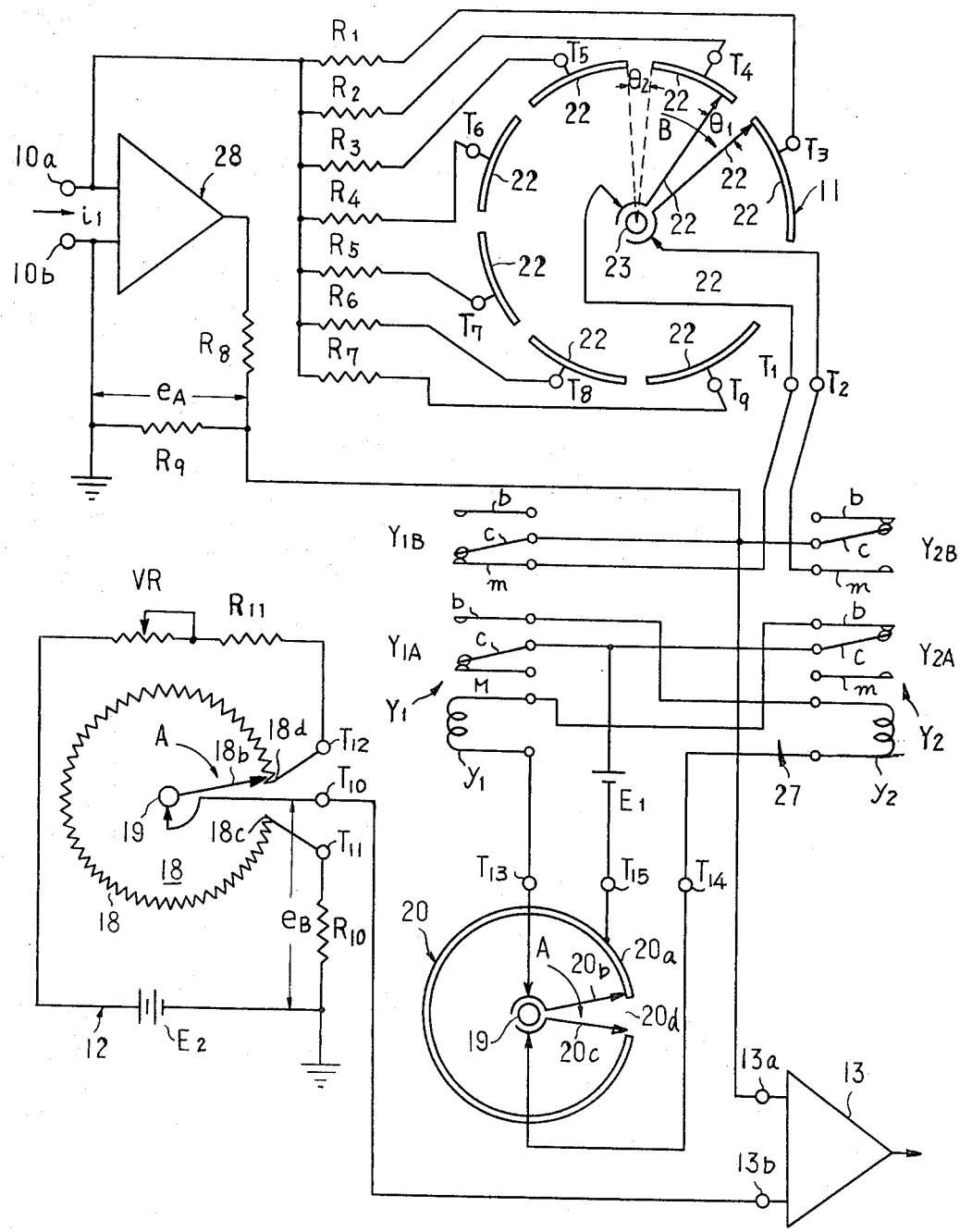
FIG. 2 is a diagram showing in greater detail the electrical circuitry of some principal components of the logarithmic recording system of FIG. 1.

Some principal components of the above outlined logarithmic recording system according to the invention are illustrated in more detail in FIG. 2. The logarithmic characteristic generating circuit 12 is composed principally of the logarithmic potentiometer 18 and a fixed resistor $R_{10}$. There are further serially connected a fixed resistor $R_{11}$ to determine the magnitude of a current to be applied to the above mentioned circuit elements, a variable resistor VR for fine adjustment of the current magnitude, and a DC power supply $E_2$ capable of producing a constant voltage.

The logarithmic potentiometer 18 is composed essentially of a wirewound resistor 18a and a brush 18b. The wire-wound resistor 18a is formed in substantially annular arrangement, and its extremities 18c and 18d are placed opposite to each other with a minimum spacing therebetween, although they are shown considerably spaced apart from each other in the drawing for the purpose of illustration. The brush 18b is mounted through an insulator, not shown, on the shaft 19 capable of multiple revolution. Thus, as the brush 18b makes each complete revolution around the shaft 19, with its free end in sliding contact with the wirewound resistor 18a, the extremities 18c and 18d of the latter are short circuited each time the brush end contacts both of them simultaneously. By thus taking full advantage of the 360° rotation of the brush 18b it is possible to obtain high fidelity logarithmic characteristic curves, through a procedure hereinafter made apparent.

The extremities 18c and 18d of the wirewound resistor 18a are connected to terminals $T_{11}$ and $T_{12}$, respectively, and the base end of the brush 18b is connected to a terminal $T_{10}$ through a contact piece marked by the rectangle in FIG. 2. One extremity of the fixed resistor $R_{10}$ is connected to the terminal $T_{11}$, whereas the other extremity thereof is grounded besides being connected to the DC power supply $E_2$. The terminal $T_{10}$ is connected to the input terminal 13b of the comparison circuit 13. By the cooperation of the logarithmic potentiometer 18 and the fixed resistor $R_{10}$ provided thereto, there is provided in this embodiment of the invention a one-digit logarithmic characteristic for common logarithms, the ratio of the maximum to minimum values being 10 to 1. Output voltage $e_B$ of this logarithmic characteristic generating circuit 12 means the potential existing between the terminal $T_{10}$ and the ground, as hereinafter referred to.

Disposed in coaxially registered relationship with the wirewound resistor 18a of the logarithmic potentiometer 18, the rotary switch 20 is formed essentially of an electrode 20a arranged annularly with a gap at 20d and a pair of angularly spaced brushes 20b and 20c mounted on the shaft 19 of the logarithmic potentiometer 18 while being electrically insulated therefrom and from each other. The brushes 20b and 20c of this switch 20 are caused respectively to contact the confronting extremities of the electrode 20a when the brush 18b of the logarithmic potentiometer 18 has shorted the extremities 18c and 18d of the wirewound resistor 18a. It should further be well noted that either of the brushes 20b and 20c of the switch 20 is caused to turn out of contact with the electrode 20a into the gap 20d at the same time when, or only shortly after, the brush 18b of the logarithmic potentiometer 18 has turned out of contact with either of the extremities 18c and 18d of the wirewound resistor 18a. The brushes 20b and 20c are connected to terminals $T_{13}$ and $T_{14}$, respectively, through contact pieces marked by the rectangles in the drawing, whereas the electrode 20a is connected to a terminal $T_{15}$.

The terminals $T_{13}$ and $T_{14}$ are connected to a coil $y_1$ of a relay $Y_1$ and a coil $y_2$ of a relay $Y_2$, respectively, of the relay circuit 27. The terminal $T_{15}$ is connected to a DC power supply $E_1$. The range switching operation hereinafter set forth is to be carried out at the instant when either of the brushes 20b and 20c of the rotary switch 20 has turned out of contact with the electrode 20a.

The range switching circuit 11 is comprised principally of the range switching device 22, a DC amplifier 28, and a plurality of, seven in this embodiment, resistances $R_1$ to $R_7$, in addition to input terminals 10a and 10b and resistances $R_8$ and $R_9$. In the illustrated embodiment of the invention, which is adapted for recording from direct currents, the DC amplifier 28 is what is known as the operational amplifier, and the resistances $R_1$ to $R_7$ function as feedback resistances. The range switching circuit 11 thus constitutes substantially an inverting operational amplifier. In this manner it is possible to prevent the fluctuations of input and output impedances even though the resistances $R_1$ to $R_7$ are successively switched over. The output voltage $e_A$ from this range switching circuit 11 is obtainable in the form of a voltage drop across the resistance $R_9$.

The resistances $R_1$ to $R_7$ each have a resistance value ten times as high as that of the immediately preceding resistance to correspond to the respective digit places within the entire recording range. The switching operation between these resistances $R_1$ to $R_7$ takes place in the order of the decreasing resistance values in case the level of the input signal increases (i.e., when the output voltage $e_A$ from the range switching circuit 11 is higher than the output voltage $e_B$ from the logarithmic characteristic generating circuit 12), and in the order of the increasing resistance values in case the input signal level decreases.

The range switching device 22 includes a pair of angularly spaced brushes 22a and 22b mounted on the shaft 23 while being electrically insulated therefrom and from each other, and seven electrodes 22c to 22i arranged in an annular configuration with predetermined circumferential spacings from one to another. The electrode 22c corresponds to the most significant digit place and the electrode 22i to the least significant digit place. These two electrodes 22c and 22i are made longer than the other electrodes 22d to 22h corresponding to the other digit places in between. It must be noted that the angle $\theta_1$ delimited by the brushes 22a and 22b is greater than the angle $\theta_2$ subtended by the spacing between each two adjoining electrodes (excepting the spacing between the electrodes 22c and 22i) so that the brushes 22a and 22b are made capable of simultaneously contacting each two adjoining electrodes (excepting the electrodes 22c and 22i). Thus, when the brush 18b of the logarithmic potentiometer 18 has short circuited the extremities 18c and 18d of the wirewound resistor 18a by bridging the same, the brushes 22a and 22b of the range switching device 22 are caused simultaneously to contact any two adjoining electrodes (excepting the electrodes 22c and 22i).

The shaft 23 of the range switching device 22 is coupled to the shaft 19 of the logarithmic potentiometer 18 through the gear 21, FIG. 1, at the gear ratio of 1 : (the number of the digit places + K), where K is an integer. This is because the adjoining ends of the electrodes 22c and 22i must be sufficiently spaced apart from each other, and the gear ratio may most suitably have a value of 1 or 2. The base ends of the brushes 22a and 22b are connected to terminals $T_1$ and $T_2$, respectively, through their respective contact pieces marked by the rectangles in the drawing. The electrodes 22c to 22i are connected to terminals $T_3$ to $T_9$, respectively, which are each connected to one extremity of each of the aforesaid resistances $R_1$ to $R_7$. The other extremities of these resistances are connected altogether to the input terminal 10a of the DC amplifier 28. The terminal $T_1$ is connected to a make contact $m$ of second relay contacts $Y_{1B}$ associated with the relay $Y_1$, whereas the terminal $T_2$ is connected to a make contact $m$ of second relay contacts $Y_{2B}$ associated with the relay $Y_2$.

The relay circuit 27 includes these two relays $Y_1$ and $Y_2$ which are composed of the coils $y_1$ and $y_2$, the first relay contacts $Y_{1A}$ and $Y_{2A}$, and the second relay contacts $Y_{1B}$ and $Y_{2B}$, respectively. All these relay contacts are composed of a make contact $m$, a break contact $b$, and a movable contact $c$. One extremity of the relay coil $y_1$ is connected via the terminal $t_{13}$ to the brush 20b of the rotary switch 20, whereas one extremity of the other relay coil $y_2$ is connected via the terminal $t_{14}$ to the brush 20c of the rotary switch. The other extremities of the relay coils $y_1$ and $y_2$ are connected to the break contacts $b$ of the first relay contacts $Y_{2A}$ and $Y_{1A}$, respectively. As a consequence, the relays $Y_1$ and $Y_2$ tend to prevent each other from being energized, in such a manner that when one of the relays is energized, the other relay is always deenergized. That one of the relays is energized which corresponds to that one of the brushes 20b and 20c which has first turned into contact with the electrode 20a of the rotary switch 20. The make contacts $m$ of the second relay contacts $Y_{1B}$ and $Y_{2B}$ are connected via the terminals $T_1$ and $T_2$ to the brushes 22a and 22b, respectively, of the range switching device 22. The movable contacts $c$ of the second relay contacts $Y_{1B}$ and $Y_{2B}$ are commonly connected to the input terminal 13a of the comparison circuit 13, whereas the movable contacts $c$ of the first relay contacts $Y_{1A}$ and $Y_{2A}$ are commonly connected to the DC power supply $E_1$. Preferably, the relays $Y_1$ and $Y_2$ should be both of the high speed type in consideration of the revolving speed of the brush 18b of the logarithmic potentiometer 18.

The rotary switch 20 and the relay circuit 27 constitute in combination a control for the range switching circuit 11, such that each time the brushes 20b and 20c of the rotary switch 20 make one complete revolution around the shaft 19, the brushes 22a and 22b of the range switching device will revolve around the shaft 23 through an angle equal to 1/(the number of the digit places + the integer K) of 360°, for switching from one digit place to another. Control of the operation of the range switching device 22 takes place only when either of the brushes 20b and 20c of the rotary switch 20 has turned out of contact with the annular electrode 20a.

The preferred embodiment of this invention being configured as hereinbefore described, a mode of its operation will now be explained with reference to FIGS. 1 and 2 assuming the case where the level of the input signal to be recorded increases. As the input signal in the form of a direct current $i_1$ is introduced into the range switching circuit 11 through its input terminal 10a, the signal is first amplified by the DC amplifier 28 and causes a voltage drop $e_A$ across the resistance $R_9$. At the logarithmic characteristic generating circuit 12 there is also produced an output voltage $e_B$ between the terminal $T_{10}$ and the ground in accordance with the angular position of the brush 18b of the logarithmic potentiometer 18.

The output voltages $e_A$ and $e_B$ are impressed to the input terminals 13a and 13b, respectively, of the comparison circuit 13, where the voltages are compared and the difference therebetween amplified. In case the level of the input signal increases, as above assumed, the voltage $e_A$ from the range switching circuit 11 is always higher than the voltage $e_B$ from the logarithmic characteristic generating circuit 12. The output signal from the comparison circuit 13 is delivered to the servomotor 16 via the chopper circuit 14 and the AC amplifying circuit 15.

The servomotor 16 functions to revolve through the gear 17 the brush 18b of the logarithmic potentiometer 18 which is mounted on the shaft 19. Since now it is assumed that the input signal level increases, the brush 18b is caused to revolve in the direction in which the output voltage $e_B$ increases, that is, in the direction of the arrow A as indicated in FIG. 2. Accordingly, the brushes 20b and 20c of the rotary switch 20, which are mounted on the shaft 19, also revolve in the same direction as marked by the arrow A in the same drawing. The brushes 22a and 22b of the range switching device 22, which are both mounted on the shaft 23 coupled to the shaft 19 through the gear 21, are now caused to revolve in the direction of the arrow B.

In FIG. 2 the brush 18b of the logarithmic potentiometer 18 is shown in a position immediately before it reaches the extremity 18d of the wirewound resistor 18a. At this time the brush 20b of the rotary switch 20 is held in contact with the electrode 20a while the other brush 20c is out of contact therewith. The brushes 22a and 22b of the range switching device 22 are in contact with the electrodes 22d and 22c, respectively. Since now the brush 20b of the rotary switch 20 is turned on and the other brush 20c off, the relay $Y_1$ is energized while the relay $Y_2$ is deenergized. Hence, also as shown in FIG. 2, the first and the second contacts $Y_{1A}$ and $Y_{1B}$ of the relay $Y_1$ are both closed and the first and the second contacts $Y_{2A}$ and $Y_{2B}$ of the relay $Y_2$ both opened, with the result that the resistance $R_2$ of the range switching circuit 11 becomes connected to the feedback path to the DC amplifier 28.

As the input signal level further increases, the brush 18b of the logarithmic potentiometer 18 turns in the direction of the arrow A in sliding contact with the wirewound resistor 18a. When the brush 18b has thus reached the extremity 18d of maximum resistance, the output voltage $e_B$ of the logarithmic characteristic generating circuit 12 has the maximum value $10e_2$. If the output voltage $e_A$ of the range switching circuit has the value $10e_1$ at this instant, the two voltage values are in the relation, $10e_1 > 10e_2$.

As the brush 18b of the logarithmic potentiometer further turns slightly in the direction of the arrow A and into contact with both the aforesaid extremity 18d and the other extremity 18c of minimum resistance, thereby short circuiting these two extremities of the wirewound resistor 18a, then the brush 20c of the rotary switch 20 turns into contact with the electrode 20a while the other brush 20b is still held in contact therewith. The relay $Y_1$ also is still held energized, so that the other relay $Y_2$ remains deenergized even if the brush 20c of the rotary switch 20 contacts the electrode 20a. Thus, the resistance $R_2$ of the range switching circuit 11 is held connected to the feedback path to the DC amplifier 28. It will now be clear that no switching operation takes place when the brush 18b of the logarithmic potentiometer 18 has bridged both extremities 18c and 18d of the wirewound resistor 18a.

The output voltage of the logarithmic characteristic generating circuit 12 has the minimum value $e_1$ when the brush 18b of the logarithmic potentiometer 18 has further turned slightly in the direction of the arrow A into contact with only the extremity 18c of the wirewound resistor 18a. The brush 20b of the rotary switch 20 is then caused to turn out of contact with the electrode 20a, being positioned in its gap 20d, so that the supply of power to the coil $y_1$ discontinues to deenergize the relay $Y_1$. Consequently, the first relay contact $Y_{1A}$ are opened, and since the brush 20c has been held in contact with the electrode 20a, the other relay $Y_2$ is now energized. The first and second relay contacts $Y_{2A}$ and $Y_{2B}$ become closed, and the brush 22a of the range switching device 22 is turned off while the other brush 22b is held in contact with the electrode 22c.

Switching operation is thus accomplished from resistance $R_2$ to resistance $R_1$, the resistance $R_1$ having one tenth the value of the resistance $R_2$. The output voltage $e_A$ of the range switching circuit 11 has now the value of approximately $e_1$, which value is greater than the value $e_2$ of the output voltage $e_B$ of the logarithmic characteristic generating circuit 12. In this manner it is possible to effect smooth switching operation from resistance $R_2$ to resistance $R_1$ with the transition of the brush 18b of the logarithmic potentiometer 18 from extremity 18d to extremity 18c of the wirewound resistor 18a.

While the operation of the illustrated embodiment of the invention has been explained hereinabove assuming the input signal of increasing level, it will be apparent that in case there is supplied an input signal of decreasing level, the reversal of the above described procedure takes place, as briefly discussed in the following. In accordance with the decrease in the level of the input signal, the brush 18b of the logarithmic potentiometer 18 is caused to turn in the direction opposite to the arrow marked direction A in FIG. 2. The brushes 20b and 20c of the rotary switch 20 and the brushes 22a and 22b of the range switching device 22 are also caused to turn in the direction opposite to that indicated by the arrows A and B in FIG. 2. Accordingly, the resistances $R_1$ to $R_7$ of the range switching circuit 11 will be switched as required in the order of the numerals suffixed to their reference characters through the procedure which will be apparent from the foregoing description.

Although the present invention has been shown and described hereinbefore in terms of a specific embodiment thereof, it will be easy for those skilled in the art to devise many modifications, substitutions and changes thereof. It is therefore appropriate that the appended claims be construed broadly and in a manner consistent with the proper scope or true spirit of the invention as herein disclosed.

I claim:

1. A logarithmic recording system comprising:
    a range switching circuit including a DC amplifier to which is supplied an electric signal to be recorded, a plurality of resistances selectively connectable to a feedback path to said DC amplifier and corresponding to respective digit places within an entire recording range, and a range switching device for selectively connecting said resistances to the feedback path to said DC amplifier;
    a logarithmic characteristic generating circuit including a fixed resistor and a logarithmic potentiometer which has a wirewound resistor arranged in an annular configuration with a gap therein and a brush capable of 360° rotation in sliding contact with said wirewound resistor, said logarithmic characteristic generating circuit producing an output which varies with the change in the level of said electric signal;
    a comparison circuit for making comparison between the outputs from said range switching circuit and said logarithmic characteristic generating circuit, said comparison circuit producing an output corresponding to the difference therebetween;
    a servomotor responsive to the output from said comparison circuit and adapted to drive said range switching device and said logarithmic potentiometer at predetermined gear ratios;
    a rotary switch means driven by said servomotor in synchronism with said logarithmic potentiometer;
    a relay circuit including a pair of relays actuated by said rotary switch means for controlling the operation of said range switching device; and
    a writing mechanism driven by said range switching device for the logarithmic recording of said electric signal on a recording medium.

2. The logarithmic recording system as defined in claim 1, in which said rotary switch means comprises an electrode arranged in an annular configuration with a gap therein, and a pair of angularly spaced brushes capable of rotation in sliding contact with said electrode and connected respectively to said pair of relays of said relay circuit, the angle between said pair of brushes being greater than the angle subtended by said gap of said annularly arranged electrode whereby said brushes are made capable of simultaneously contacting both extremities of said electrode.

3. The logarithmic recording system as defined in claim 2, in which each switching operation from one of said resistances to another by said range switching device is caused to be completed when one of said brushes of said rotary switch means has been turned into said gap out of contact with said electrode.

* * * * *